United States Patent
Hsu

(10) Patent No.: US 6,261,985 B1
(45) Date of Patent: Jul. 17, 2001

(54) HIGH TEMPERATURE NON-STICK COOKWARE

(76) Inventor: Peter Hsu, No. 23-7, Alley 45, Section 2, Bau-Arm Street, Su-Lin, Taipei (TW)

(*) Notice: Subject to any disclaimer, the term of this patent is extended or adjusted under 35 U.S.C. 154(b) by 0 days.

(21) Appl. No.: 08/916,516

(22) Filed: Aug. 22, 1997

(51) Int. Cl.$^7$ .................................................. C04B 33/00
(52) U.S. Cl. ......................... 501/141; 501/103; 501/105; 501/127
(58) Field of Search .................................... 428/701, 702, 428/446, 440; 501/141

(56) References Cited

U.S. PATENT DOCUMENTS

| | | |
|---|---|---|
| 3,871,890 | * 3/1975 | Eppler et al. . |
| 4,123,401 | * 10/1978 | Berhhmans et al. . |
| 4,851,287 | * 7/1989 | Hartsing, Jr. . |

* cited by examiner

Primary Examiner—Deborah Jones
Assistant Examiner—Jennifer McNeil
(74) Attorney, Agent, or Firm—H. C. Lin

(57) ABSTRACT

A high temperature cookware is made with material to render it heat more uniformly, at a lower temperature to avoid over-burning, more resistant to cracking due to sudden change in temperature, and less fragile. The material includes cordierite to possess small expansion coefficient, mullite to store more heat, talc to lower the firing temperature, and refractory clay for high heat conductivity. Other ingredients are added to enhance far-infrared radiation with certain kinds of metallic oxide.

After the body is fired, the cookware is glazed to be impervious to water and coated with Teflon to make the cookware non-sticking.

2 Claims, 2 Drawing Sheets

HIGH TEMPERATURE NON-STICK COOKWARE

INTRODUCTION

This invention relates to cookware, in particular to non-stick ceramic cookware.

In the present society, modern technology has made life ever changing. Cooking is no longer just to fill the stomach as in the 1950's. A modern family stresses the quality of life. Every thing must be done fast and in good taste. Especially, the daily three meals should save time and energy, so that cooking can be done quickly without losing the original taste and nourishment and without adding artificial flavor. Healthy food is the desire of every household. To this end, industries throughout the developed countries in the world are utilizing high technologies to develop advanced and practical cookware to satisfy the need.

The present ceramic cooker in the market has some shortcomings. The cooker is not coated with non-stick material. After cooking, the cooker must be scrubbed for cleaning and presents a nuisance.

Traditional non-stick cooker is coated with non-stick material over metallic material. Because the metallic material transmit heat unevenly, the temperature at the heated point is very high, but the temperature at the non-heated point is low.

SUMMARY

An object of the present invention is to provide a high temperature cookware. Another object of this present invention is to provide a high speed cookware without losing the original taste. Still another object of the present invention is to develop a cookware which serves to fry, to bake, to stir fly and to boil. A further object of the present invention is to utilize far infra-red radiation to cook without burning and sticking to the utensil.

These objects are achieved in this invention by utilizing high temperature ceramic to provide far-infrared radiation. The material contains cordierite, mullite and petalite. Such a ceramic possesses heat preservation and conduction properties. The cookware can heat up quickly without burning, and provide uniform temperature. By adding another layer of polytetrafluoroethylene (PTFE), also known as Teflon, the cookware become non-sticking. The material can store heat to reradiate as far-infrared rays and overcome the problem of non-uniform heat conduction. This invention combines the merits of uniform heating of traditional pottery pot and the non-sticking property of modern frying pan.

DETAILED DESCRIPTION OF THE PREFERRED EMBODIMENT

Figure 1:
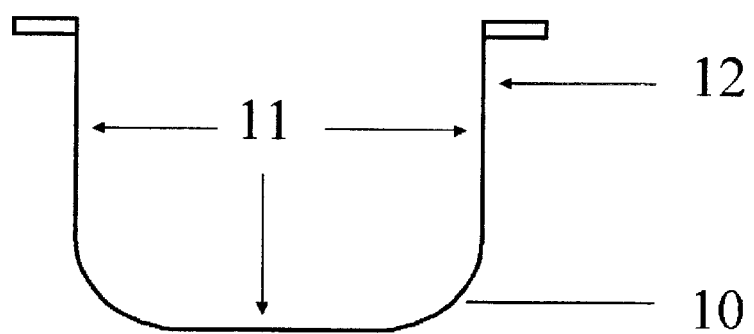
FIG. 1 shows a traditional ceramic pot.

FIG. 1 shows a traditional pottery pot. The body 10 is made of ceramic material. The inside surface 11 and the outside surface 12 are coated with a layer of glaze to make it impervious to moisture and make it good looking.

Figure 2:
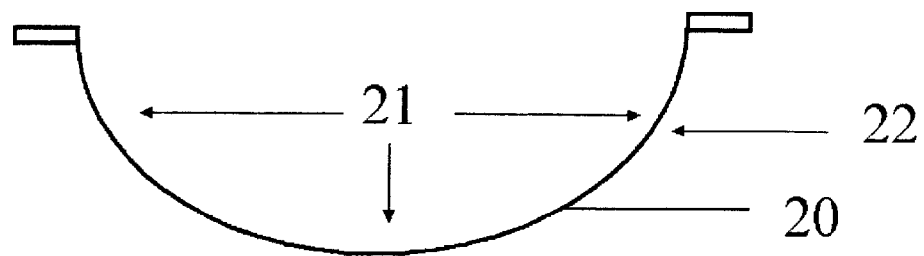
FIG. 2 shows a traditional non-stick frying pan.

FIG. 2 shows a traditional non-stick frying pan 20. The pan itself is made of metal. The inside surface 21 is coated with Teflon to make it non-sticking, and the outside surface 22 is coated with glaze to make it impervious to water and good looking.

Figure 3A:
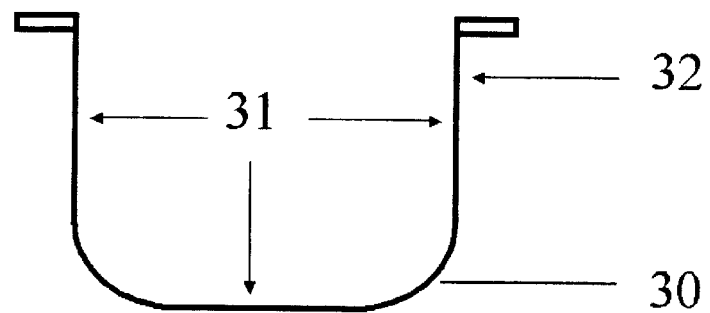
FIGS. 3($a$–$c$) show shows a high temperature non-stick cookware including a pot, a wok and frying pan.
Figure 3B:
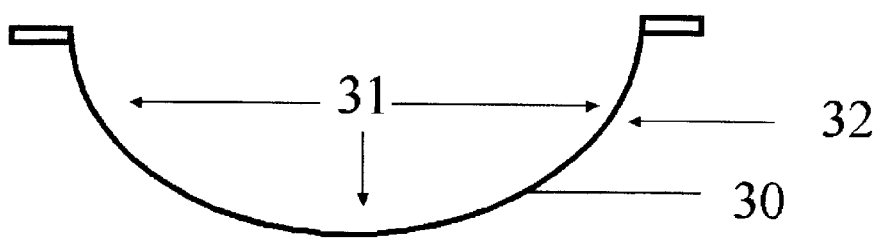
Figure 3C:
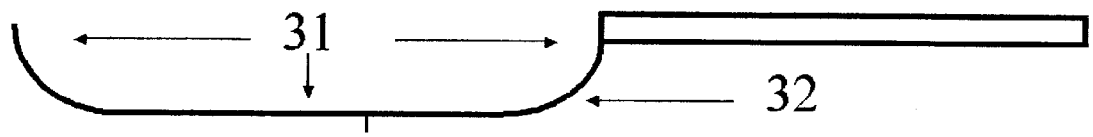

FIGS. 3($a$–$c$) show the high temperature non-stick cookware of the present invention, including pots, woks, frying pans and baking pans. The body 30 of the cookware is made of new ceramic material of the present invention. The inside surface 31 is coated with Teflon material to make it non-sticking The outside surface 32 is coated with glaze to make it impervious to water and good looking.

The new ceramic material of the present invention has unique high temperature characteristics and is made of the following unique composition:

|  | Heat conductivity watt/meter-° K. (?) | Expansion coefficient 40 ° C.–400 ° C. × $10^{-6}$/° C. |
|---|---|---|
| Cordierite | 1.13 | 0.50 |
| Mullite | 2.1 | 4.00 |
| Petalite | 3.12 | 0.30 |
| Refractory Clay | 16.7 | 6.9 |

The chemical formulas of the high temperature material of this invention are as follow:

Cordierite $[2Mg_2Al_4Si_5O_{18}]=[2MgO.2A_2O_3.5SiO_2]$

Mullite $[Al_6Si_2O_{13}]=[3Al_2O_3.2SiO_2]$

Petalite $[Al_2O_3.8SiO_2]$

Kaolinite $[Al_2Si_2O_5(OH)_4]_2$

Talc $[Mg_3Si_4O_{10}]_2$

Refractory Clay $[Al_2O_3.Fe_2O_3]$

The cordierite has low heat conductivity coefficient and its heat expansion coefficient is the lowest among heat resistant ceramic. When it is used in the present invention, the low heat conductivity enables it to store high temperature and reradiate far-infrared heat energy. When food is heated, the uneven heat generated from a gas burner or an electric stove is stored and reradiate as uniform heat. Thus, the food is not over-burnt. Due to its low expansion coefficient, cracking of the cookware does not happen when the cookware is suddenly cooled down.

Mullite has slightly higher heat conductivity than cordierite. Its heat absorption capability is better. Although the expansion coefficient is somewhat higher, using together with cordierite produces complementary effect, rendering the combination not to crack upon sudden cooling and yet capable of high heat storage.

Talc is used in high temperature ceramic to lower the firing temperature due to high magnesium and silicon. When it is used in conjunction with cordierite and mullite, the ceramic can be fired under 1500 degrees centigrade to produce a low expansion structure.

Petalite is used for its low melting point, lowering the firing temperature of the material and yet maintaining its mechanical property. Petalite is the best ingredient to lower the firing temperature.

Refractory clay has a high heat conductivity coefficient (w/m-° k) of 16.7. It is used in this invention to increase the heat conduction capability. The refractory clay also has more than 60 percent of aluminum oxide and high degree of adhesive property. The addition of this ingredient increases the strength and plasticity of the structure. With these characteristics, the body material can be made into high temperature far-infrared ray cookware, which is more heat resistant and less fragile than traditional ones. The finished product can be coated with non-sticking layer and made into frying pans, woks, fryers, pots, etc., which are better than what is available in the market today.

The ceramic material of the present invention can further be added with heat radioactive material to increase its heat radiating capability. Such heat radioactive material are metallic oxides including: zirconium oxide ($ZrO_2$), silicon dioxide ($SiO_2$), aluminum oxide ($Al_2O_3$), titanium dioxide ($TiO_2$), cobalt oxide ($Co_3O_4$) and ferric oxide ($Fe_2O_3$), etc.

This invention uses the foregoing high temperature storage, far infrared radiant material to make cookware. A practical formula is as follows: 30%–50% cordierite, 10%–20% mullite, 10%–25% petalite, 5%–10% talc, 20%–40% kaolinite; 10%–20% refractory clay. The processing steps for the material includes: mixing the ingredients in appropriate proportions, adding 20%–35% amount of water, and grinding for 10–24 hours depending on the grain size and grinding speed. After grinding, the paste is adjusted for viscosity. Ordinarily solvents serve as agent for viscosity adjustment to facilitate molding. After the body material has been prepared, the material is molded to about 3 mm–12 mm thick. After the body material is dried, the body is glazed. The body is then fired for 10–20 hours at 1200–1500° C. until the water absorption is controlled to 5–30% for ease in applying the non-sticking Teflon. The Teflon is first applied at 100–150° C. for 3–10 minutes, before baking at 380–420° C.

In addition, auxiliary material is added to the body material to increase the far-infrared radiation capability. One or more of the following material may be added: $ZrO_2$, $SiO_2$, $Al_2O_3$, $TiO_2$, $Co_3O_4$, $Fe_2O_3$.

For non-sticking cookware, the additive in the previous paragraph may also be added during the Teflon coating process.

The far infrared radiation efficiency has been tested by the Industrial Technology Research Institute in Taiwan to be 0.8–0.9. During cooking, the high temperature storage and radiation of heat energy resonates with heat absorption, thereby shortening the cooking time and preserving the water content and original taste of the food.

During the firing of the body material, 5%–30% of the absorbed water are evaporated as air vents, which can improve the adhesion of the Teflon later for non-sticking surface. The Teflon are bonded to the vents vacated by water vapor.

In conclusion, this invention achieve the object of storing high temperature for far infrared radiation. Repeated experimentation has proven that the invented ceramic can provide uniform high temperature, non-sticking cookware for frying, stir-frying, baking and boiling. Because of its high temperature storage, far-infrared radiation property, the food does not get burnt, can preserve the original nourishment and taste, and can be cooked at moderate heat.

While preferred embodiment of the invention has been shown and described, it will be apparent to those skilled in this art that various modifications may be made in these embodiments without departing from the spirit of the present invention. Such modifications are all within the scope of this invention.

What is claimed is:

1. A high temperature ceramic material with far-infrared radiation reflectance property, which can be mixed with water to fabricate cookware, comprising:

talc, kaolinite, refractory clay, and at least one ingredient selected from the group consisting of cordierite, mullite and petalite, and an ingredient to enhance far-infrared radiation selected from the group consisting of zirconium oxide ($ZrO_2$), silicon dioxide ($SiO_2$), aluminum oxide ($Al_2O_3$) titanium oxide ($TiO_2$), cobalt oxide ($Co_3O_4$) and ferric oxide ($Fe_2O_3$).

2. A high temperature ceramic material as described in claim 1, wherein the percentage in weight of said ingredient to enhance far infrared radiation is 5%–10%.

* * * * *